Patented Oct. 16, 1928.

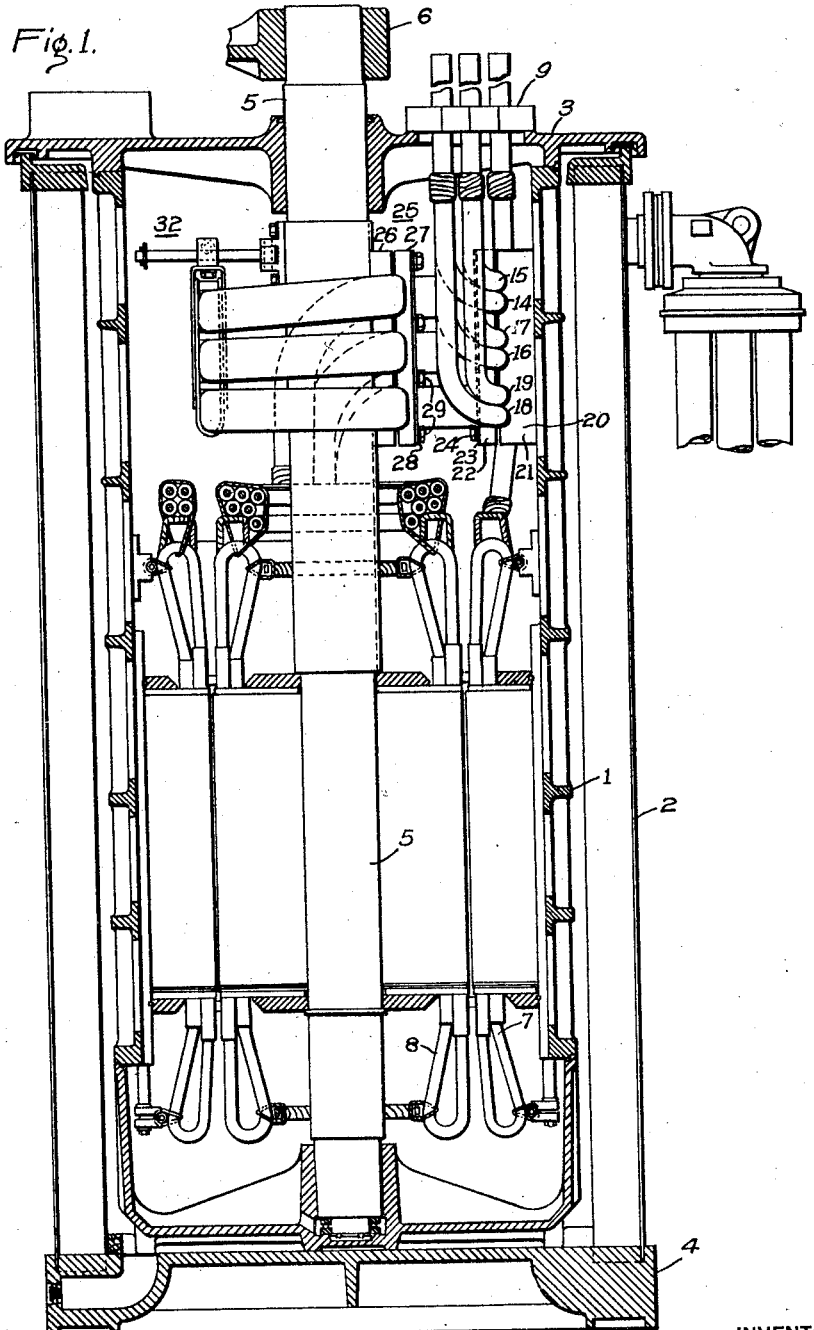

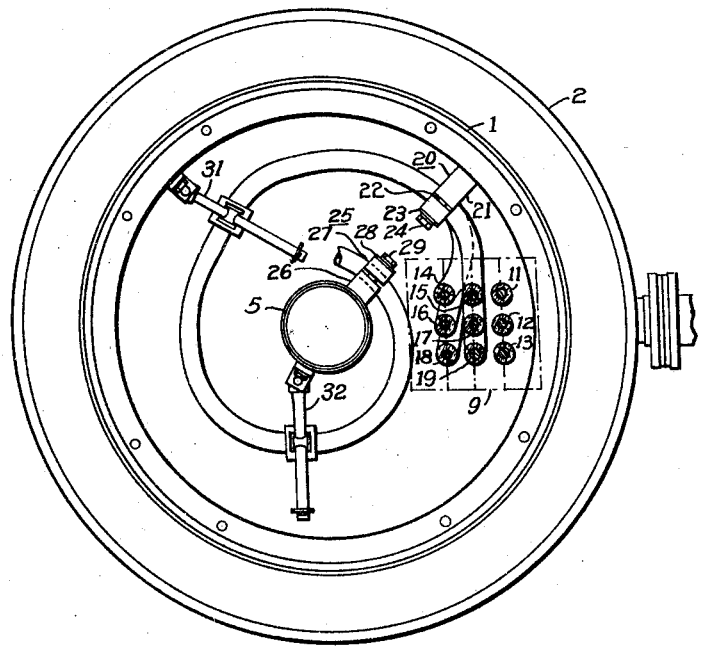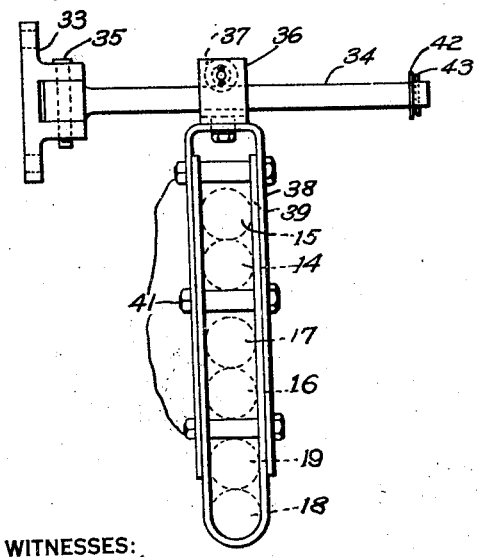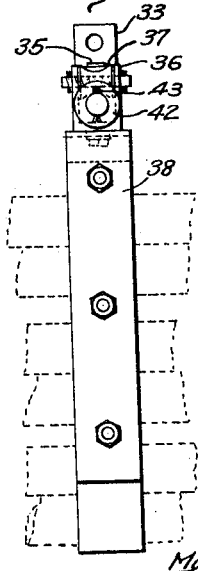

1,687,648

UNITED STATES PATENT OFFICE.

MORRIS GELMAN AND FRANK URSCHLER, SR., OF PITTSBURGH, PENNSYLVANIA, ASSIGNORS TO WESTINGHOUSE ELECTRIC AND MANUFACTURING COMPANY, A CORPORATION OF PENNSYLVANIA.

INDUCTION REGULATOR.

Application filed August 20, 1924. Serial No. 733,037.

Our invention relates to induction regulators and more particularly to means for supporting the leads of such regulators.

One object of our invention is to reduce the size of the tank necessary to accommodate the regulator.

Another object of our invention is to wind the rotor leads about the rotor shaft in a substantially flat coil that may expand and contract as the rotor of the regulator is rotated.

Our invention comprises a clamp attached to the frame of the regulator for retaining the leads as they pass into the casing, a clamp attached to the rotor shaft for supporting the rotor ends of the leads, and intermediate supports for the intervening portion of the leads to maintain the leads at the same elevation and permit a free movement thereof as the shaft rotates. This method of supporting the rotor leads does not interfere with the free movement of the leads when the regulator shaft is turned. Prior methods of support for the leads require them to be wound about 2½ turns around the shaft. To prevent the leads sagging and touching the coil ends, it was necessary to increase the height of the regulator in order to obtain additional space between the coils and the top cover.

Our invention will be better understood by reference to the accompanying drawing, in which Figure 1 is a vertical sectional view of an induction regulator employing our invention;

Fig. 2 is a plan view of the supports; and

Figs. 3 and 4 are side and end elevations, respectively, of the lead bracket supports.

Referring to the drawings, the numeral 1 indicates the frame of the induction regulator, which rests within a tank 2 that is provided with a top cover 3 and a base portion 4. A vertical shaft 5 extends from the base through the cover portion, and is equipped with a worm sector 6 for effecting rotation of the shaft. The regulator is provided with a stator winding 7 that is attached to the frame and with a rotor winding 8 that is secured to the shaft 5. A split and apertured block 9 is provided upon the cover 3 for supporting the leads as they enter the tank 2. Through this block 9 pass three stator leads 11, 12 and 13, and six rotor leads 14 to 19, inclusive.

A support or split block 20 is provided on one side of the tank for supporting the six rotor leads vertically with respect to each other, and comprises a base portion 21, a cleat 22, a strap 23 and suitable clamping means therefor, such as bolts 24.

A support or split block 25, which is attached to the shaft 5, is provided for supporting the rotor ends of the leads 14 to 19, inclusive, and is similar in construction to the support 20, comprising a base portion 26, a cleat 27, a metal strap 28, and retaining bolts 29 therefor. A pair of bracket supports of like construction are also provided, one of these supports 31 being pivotally secured to the frame structure 1, and the other 32 being pivotally attached to the shaft 5. The supports 31 and 32, best illustrated in Figs. 3 and 4 of the drawing, comprise a bracket 33 and an arm 34 pivotally attached thereto by means of a pin 35. A pulley 36 is provided with a roller 37 for traveling upon the arm 34, and this pulley supports a hanger or frame structure comprising oppositely disposed U-shaped straps 38 and 39 that are attached to each other by means of bolts or pins 41. In this hanger or rack, the six rotor leads are carried in pairs, as indicated in Figs. 3 and 4.

The outer end of the arm 34 is provided with a suitable means for preventing the blocks from traveling beyond the end of the arm, such as a washer 42 and a cotter pin 43.

The operation of our device is as follows: During operation of the induction regulator from the position of maximum boost to maximum buck, the shaft 5 is rotated approximately 180°. The stationary ends of the leads are supported by the block 20, while the rotor ends of the leads are supported by the block 25 rotating with the shaft. The intermediate portions of the leads are supported by the bracket supports 31 and 32, which may be attached either to the shaft 5 or to the frame 1, as shown.

As the shaft 5 is rotated, the coiled leads will expand or contract, in the form of a flat spiral, and cause the hangers that are attached to the pulleys 36 to move radially with respect to the shaft 5 along the supporting arms 34. The supporting arms are pivoted to permit a certain amount of swinging motion, thus providing adequate freedom of movement for the leads.

Obviously, many changes may be made in the details of the device, as described, within the spirit and scope of our invention, and we do not wish to be limited other than by the appended claims.

We claim as our invention:

1. In an induction regulator, the combination with a frame, a stator winding and a rotor winding within said frame, and a shaft for supporting said rotor winding, of leads connected to said rotor winding, and means carried by said shaft for supporting said leads in the form of a flat spiral about said shaft.

2. In an induction regulator, the combination with an upright frame, a substantially vertical shaft within said frame, and a rotor winding mounted upon said shaft, of a plurality of leads extending into and supported by said frame and terminating in said rotor winding, and means carried by said frame and means carried by said shaft for supporting said leads in the form of a flat spiral about said shaft.

3. In an induction regulator, the combination with an upright frame, a substantially vertical shaft within said frame, and a rotor winding mounted upon said shaft, of a plurality of leads extending into and supported by said frame and terminating in said rotor winding, a cleat upon said shaft for holding said leads, and substantially radial supports for loosely supporting said leads in the form of a flat spiral about said shaft.

4. In an induction regulator, the combination with a frame, a substantially vertical shaft within said frame, and a rotor winding mounted upon said shaft, of a plurality of leads extending into said frame and terminating in said rotor winding, means within said frame and attached thereto for supporting said leads, means attached to said shaft for supporting said leads, and means intermediate said supports for supporting said leads substantially in the form of a flat spiral.

5. In an induction regulator, the combination with a frame, a substantially vertical shaft within said frame, and a rotor winding mounted upon said shaft, of a plurality of leads extending into said frame and terminating in said rotor winding, substantially radial supports within said frame, and racks movably mounted upon said radial supports for supporting said leads.

6. In an induction regulator, the combination with a frame, a substantially vertical shaft within said frame, and a rotor winding mounted upon said shaft, of a plurality of leads extending into said frame and terminating in said rotor winding, means attached to the interior of said frame for supporting said leads, means attached to said shaft for supporting the rotor ends of said leads, said two supporting means being at substantially the same elevation, pivoted supporting arms positioned substantially radially within said frame, and racks movably mounted upon said radial supports for supporting said leads.

7. In an induction regulator, the combination with a frame, a substantially vertical shaft within said frame, and a rotor winding mounted upon said shaft, of a plurality of leads terminating in said rotor winding, supporting arms positioned substantially radially within said frame, and racks movably mounted upon said radial supports for supporting said leads.

8. In an induction regulator, the combination with a frame, a shaft within said frame, and a rotor winding mounted upon said shaft, of a plurality of leads terminating in said rotor winding, a plurality of supporting arms pivotally positioned within said frame, and racks movably mounted upon said supports for supporting said leads.

9. In an induction regulator, the combination with a frame, a shaft within said frame, and a rotor winding mounted upon said shaft, of a plurality of leads terminating in said rotor winding, a supporting arm pivotally attached to said shaft, and a supporting arm pivotally attached to said frame, said supporting arms being adapted for supporting said leads.

In testimony whereof, we have hereunto subscribed our names this 14th day of August, 1924.

MORRIS GELMAN.
FRANK URSCHLER, Sr.